G. A. GOODSON.
MEANS FOR REGULATING CLOCKS BY HERTZIAN WAVES.
APPLICATION FILED FEB. 21, 1910.

1,124,129.

Patented Jan. 5, 1915.
8 SHEETS—SHEET 2.

Witnesses.
A. H. Opsahl.
W. H. Souba.

Inventor.
George A. Goodson.
By his Attorneys
Williamson Merchant

G. A. GOODSON.
MEANS FOR REGULATING CLOCKS BY HERTZIAN WAVES.
APPLICATION FILED FEB. 21, 1910.

1,124,129.

Patented Jan. 5, 1915.
8 SHEETS—SHEET 6.

Witnesses.
A. H. Opsahl.
U. H. Souba.

Inventor.
George A. Goodson
By his Attorneys
William Merchant

G. A. GOODSON.
MEANS FOR REGULATING CLOCKS BY HERTZIAN WAVES.
APPLICATION FILED FEB. 21, 1910.

1,124,129. Patented Jan. 5, 1915.
8 SHEETS—SHEET 7.

Witnesses:
A. H. Opsahl.
W. H. Souba.

Inventor:
George A. Goodson
By his Attorneys
Williamson & Merchant

G. A. GOODSON.
MEANS FOR REGULATING CLOCKS BY HERTZIAN WAVES.
APPLICATION FILED FEB. 21, 1910.

1,124,129.

Patented Jan. 5, 1915.

Witnesses.
A. H. Opsahl.
W. H. Souba.

Inventor.
George A. Goodson
By his Attorneys.
Williamson Merchant

UNITED STATES PATENT OFFICE.

GEORGE A. GOODSON, OF MINNEAPOLIS, MINNESOTA.

MEANS FOR REGULATING CLOCKS BY HERTZIAN WAVES.

1,124,129.   Specification of Letters Patent.   Patented Jan. 5, 1915.

Application filed February 21, 1910. Serial No. 545,022.

*To all whom it may concern:*

Be it known that I, GEORGE A. GOODSON, a subject of the King of Great Britain, residing at Minneapolis, in the county of Hennepin and State of Minnesota, have invented certain new and useful Improvements in Means for Regulating Clocks by Hertzian Waves; and I do hereby declare the following to be a full, clear, and exact description of the invention, such as will enable others skilled in the art to which it appertains to make and use the same.

My present invention relates to means for regulating clocks by Hertzian waves or electro-magnetic oscillations and is in the nature of an improvement on, or elaboration of, the apparatus designed for the same purpose and disclosed and broadly claimed in my prior application Serial Number 452,573, filed September 11, 1908.

The invention consists of the novel devices and combinations of devices hereinafter described and defined in the claims.

The present application is based upon and illustrates a commercial form of my improved clock setting or regulating apparatus which has been, for some time, and is, at present, doing actual work in the regulation of clocks located at points distant from the regulating or sending station. Briefly outlined, this apparatus comprises as follows: At the sending or regulating station, for generating the Hertzian waves or electro-magnetic oscillations, I employ an alternating current generator which is connected to a sending antenna or aerial wire through a step-up transformer. For driving the generator, I employ a multi-cylinder explosive engine, the throttle, timer and igniter of which are controlled by a centrifugal engine-driven governor. The engine is cranked or given its initial starting speed by a small electric motor and this motor is controlled, primarily, by a master-clock, through a discharger and an engine starting switch. Associated with the so-called discharger is a so-called time circuit switch and sparking switch, which latter, in a sense, constitute a part of the said discharger. At each receiving station, of which there may be practically an unlimited number, one or more receptor clocks are connected or adapted to be connected to a coherer, one side of which is grounded and the other side of which is connected to a receiving antenna. The receptor clock comprises an electrically actuated setting device or time corrector, which is connected in a local circuit having a relatively strong battery, and which circuit is adapted to be closed by a relay actuated by a magnet connected in another local circuit having a relatively weak battery, of such low potential that its current will flow through the filings of the coherer only after the resistance of the latter has been reduced by the passage therethrough of Hertzian waves sent out from the sending station. Connected in multiple, in the local circuit, is a decoherer and a so-called selector. The function of the decoherer is, as is well understood, to restore the filings of the coherer to normal condition, and in the improved apparatus, this decoherer is a part essentially distinct from the mechanism of the receptor clock and is operated as long as the local receiving circuit is closed. The so-called selector is a magnetically actuated device, the action of which is retarded or timed by proper setting or adjustment, so that the Hertzian waves from the sending station must be continued for some definite predetermined period, say five seconds, for example, in order that they may be effective on the receptor clock. The chief purpose of this so-called selector is to make the receptor clock non-sensitive to, or uneffected by, Hertzian waves sent through space for the purpose of transmitting messages, such, for example, as those sent by the Marconi system of wireless telegraphy.

In the accompanying drawings which illustrate the invention, like characters indicate like parts throughout the several views.

Referring to the drawings, Fig. 6$^a$ is a section showing one of the magnet controlled compression valves of the engine structure.

*Master-clock.*—The master-clock, which is the primary controlling element of the entire system, may be of any approved construction so far as its general features are concerned, but is preferably an electrically wound or actuated pendulum clock which is kept in accurate time.

Figures 2, 3, 4:
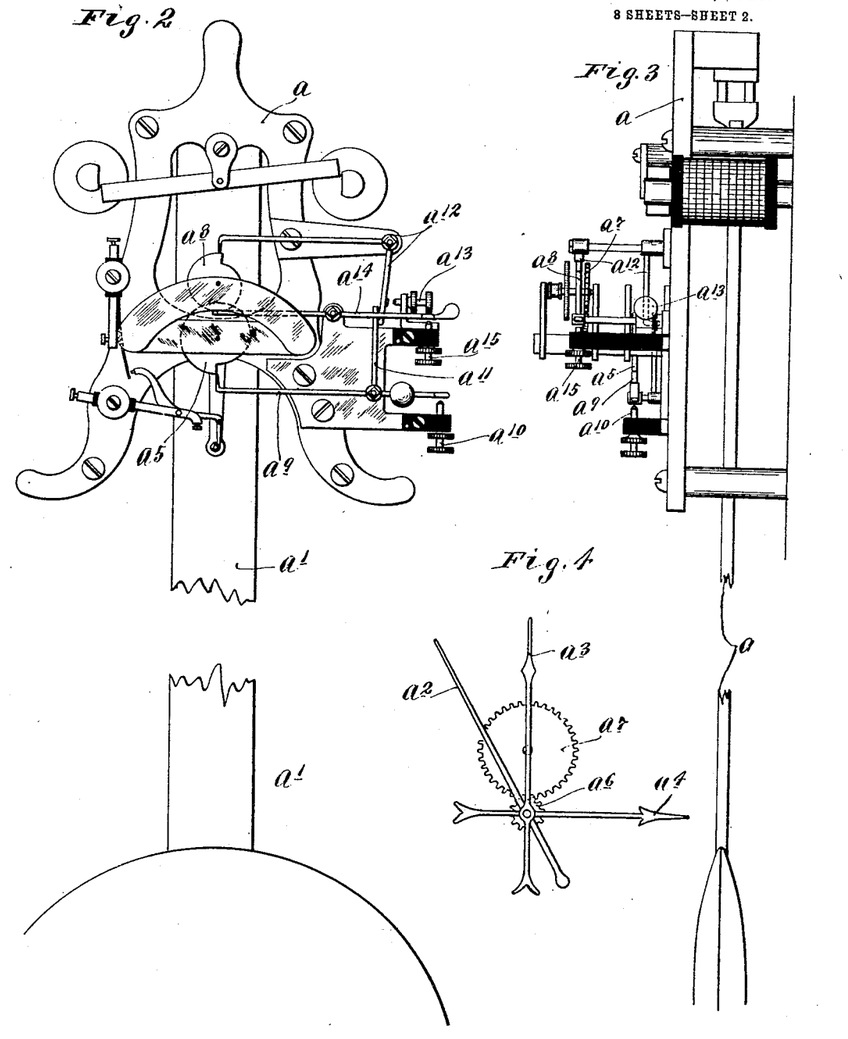
Fig. 2 is a view in front elevation, with parts broken away and some parts removed, showing the master-clock which is located at the sending station.
Fig. 3 is a side elevation of the parts shown in Fig. 2.
Fig. 4 is a fragmentary detail in front elevation, showing a portion of the master-clock.

Referring particularly to Figs. 2, 3 and 4, $a$ represents a metallic framework which supports the clock mechanism, $a^1$ indicates the pendulum, $a^2$ the second hand, $a^3$ the minute hand, and $a^4$ the hour hand of the master-clock. The second hand $a^2$ carries a cam $a^5$ and the minute hand $a^3$ carries a spur pinion $a^6$. The pinion $a^6$ meshes with a spur gear $a^7$, as shown, of three times the diameter thereof, and the said gear $a^7$ carries a cam $a^8$. Obviously, from the above statements, the cam $a^5$ will be rotated once every minute, while the cam $a^8$ will be rotated once every three hours. The cam $a^5$ operates on the inner end of an intermediately pivoted contact lever $a^9$, the weighted outer end of which tends to normally engage a contact screw $a^{10}$ supported by, but insulated from, the clock framework $a$. Said contact lever $a^9$ is provided with an upwardly extended arm $a^{11}$ and it is normally engaged by the depending end of a bell crank contact lever $a^{12}$, the inner end of which is subject to the slow moving cam $a^8$. The depending end of the said contact lever $a^{12}$ tends to normally engage with the contact screw $a^{13}$ secured on, but insulated from, the clock framework $a$. A third contact lever $a^{14}$ is intermediately pivoted to the framework $a$, at its inner end, is subject to the cam $a^8$, and, at its outer end, tends to normally engage with a contact screw $a^{15}$ supported by, but insulated from, the clock framework $a$.

In a commercial operative clock-setting system which I have put into actual use, I have employed what I herein designate as a spark-generating plant and which includes a 36 kilowat alternating current generator, a multi-cylinder explosive engine for driving the said generator to produce the spark when a certain desired speed has been acquired, and an electric motor and coöperating parts for automatically cranking and starting the engine, under control of the master-clock.

*Alternating generator.*—The alternating generator is indicated as an entirety by the character $b$ and, in the present instance, its revolving field is carried by a shaft $b^1$, one end of which is connected to the crank shaft of the driving engine preferably by a flexible coupling $b^2$. The field terminals of the generator are indicated by $b^3$, and the armature terminals are indicated by $b^4$.

Figure 5:
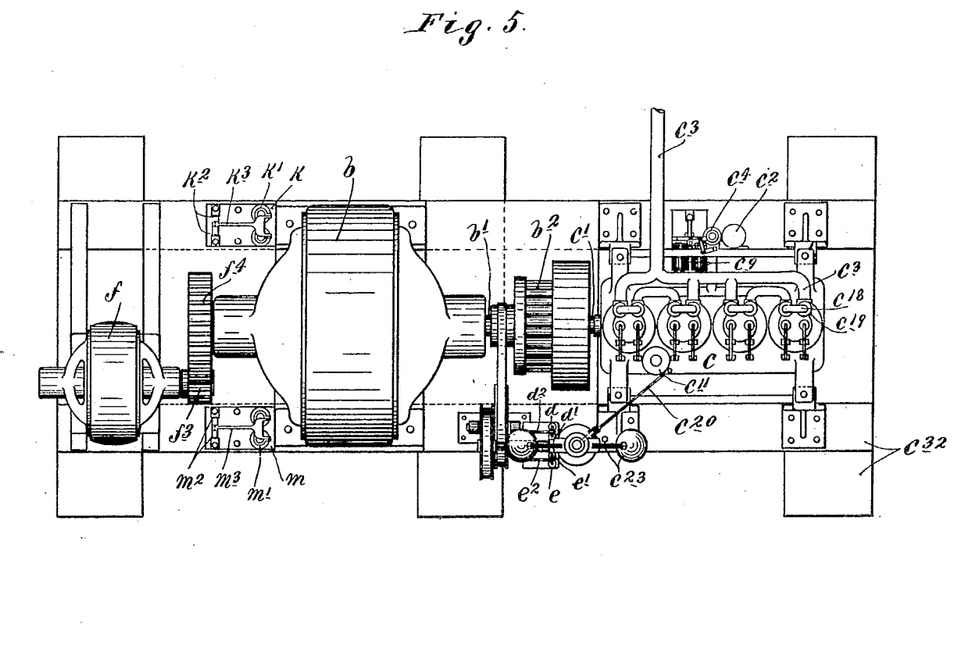
Fig. 5 is a plan view of the spark-generating plant of the sending station.

*Explosive engine.*—The multi-cylinder engine may be of any standard type and is indicated as an entirety by the character $c$. Its crank shaft $c^1$, as already indicated, is directly but flexibly connected to the shaft of the alternating current generator by the coupling $b^2$, as best shown in Fig. 5. The explosive vapor is delivered into the cylinder of the engine from a carbureter $c^2$, through the body and branches of a vapor pipe $c^3$ which is arranged to be opened and closed by a throttle valve mechanism $c^4$, preferably of standard construction, but which, in the application of my invention, is arranged to be opened (see Fig. 1) by a movement toward the right of a long lever $c^5$ pivoted at its lower end and provided with a contact finger $c^6$ and a small armature $c^7$, the former of which is adapted to engage a contact $c^8$ and the latter of which is subject to a magnet $c^9$. When the magnet $c^9$ is energized, the throttle valve $c^4$ will be opened by the lever $c^5$ and the contact finger $c^6$ will be engaged with the contact $c^8$, thereby closing the igniter circuits $c^{10}$ to the several cylinders of the engine. The customary timer $c^{11}$, best shown in Fig. 1, has a shaft which, for a purpose which will presently be noted, is provided with an arm $c^{12}$.

Figure 6:
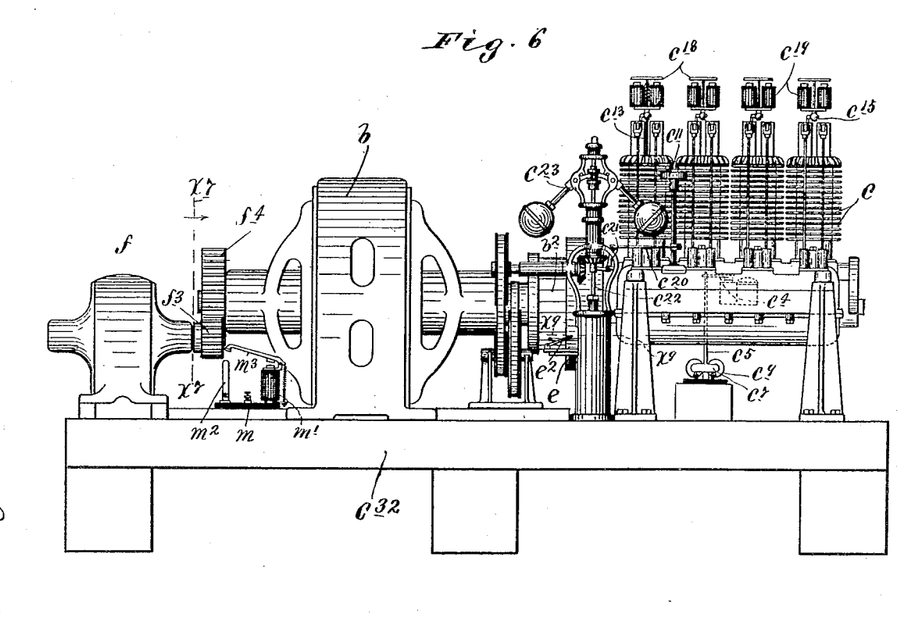
Fig. 6 is a side elevation of the parts shown in Fig. 5.
Figure 6A:
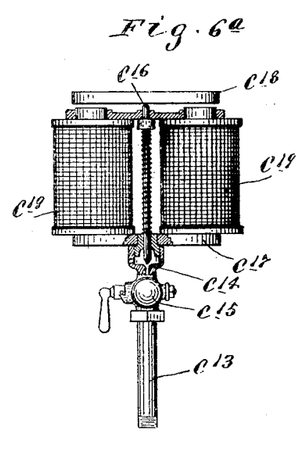

Normally, the cylinders of the explosive engine are open at their compression ends (see particularly Fig. 6ª), through vent pipes $c^{13}$ which at their upper extremities terminate in valve seats $c^{14}$ formed in cup-like heads of normally opened pet-cocks $c^{15}$. These vent passages, after the engine has been given a proper cranking speed, are adapted to be closed by vent valves $c^{16}$ of the needle valve type, which, as shown, work through magnet tail-pieces $c^{17}$, the threaded hubs of which are screwed into the respective heads $c^{15}$. The needle valves $c^{16}$ are spring-pressed upward, but are adapted to be forced downward against the valve seats $c^{14}$, by overlying armatures $c^{18}$ subject to electric magnets $c^{19}$ having the tail-piece $c^{17}$. The arm $c^{12}$ on the shaft of the timer $c^{11}$ is connected, by a link $c^{20}$ and a small bell crank $c^{21}$, to the vertically movable stem $c^{22}$ of a centrifugal engine-driven governor of standard construction, indicated as an entirety by the character $c^{23}$.

Figure 9:
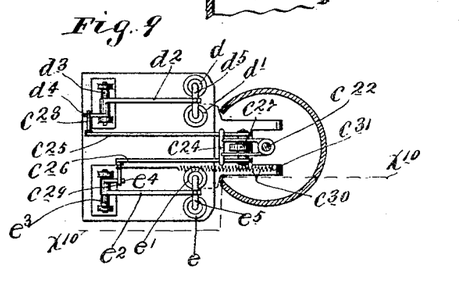
Fig. 9 is a detail in horizontal section taken on the line $x^9$ $x^9$ of Fig. 6, showing the governor control, motor cut-out and engine cut-in switches.
Figure 10:
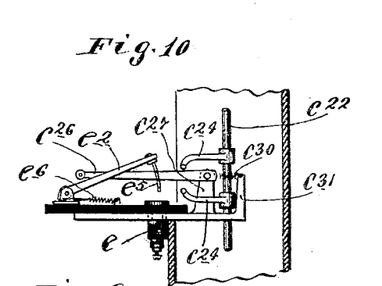
Fig. 10 is a section taken on the irregular line $x^{10}$ $x^{10}$ of Fig. 9.

*Motor cut-out, and engine cut-in switches.*—These two switches are reversely operated by the centrifugal governor $c^{23}$, and to this end, the vertically movable governor stem $c^{22}$ is provided with upper and lower arms $c^{24}$, the laterally extended ends of which are engageable with a pair of switch tripping levers $c^{25}$, best shown in Figs. 9 and 10. The two tripping levers $c^{25}$ and $c^{26}$ are rigidly connected to a common rock shaft journaled in a bearing $c^{27}$. The lever $c^{25}$ is longer than the lever $c^{26}$ and the said levers are provided, respectively, at their free ends, with projecting trip pins $c^{28}$ and $c^{29}$. A quite long coiled spring $c^{30}$ is, as shown, attached to the pins $c^{29}$ and to a fixed support $c^{31}$, which spring is arranged to yieldingly hold the levers $c^{25}$ and $c^{26}$ alternately above and below the dead center in respect to the said spring.

Figure 1:
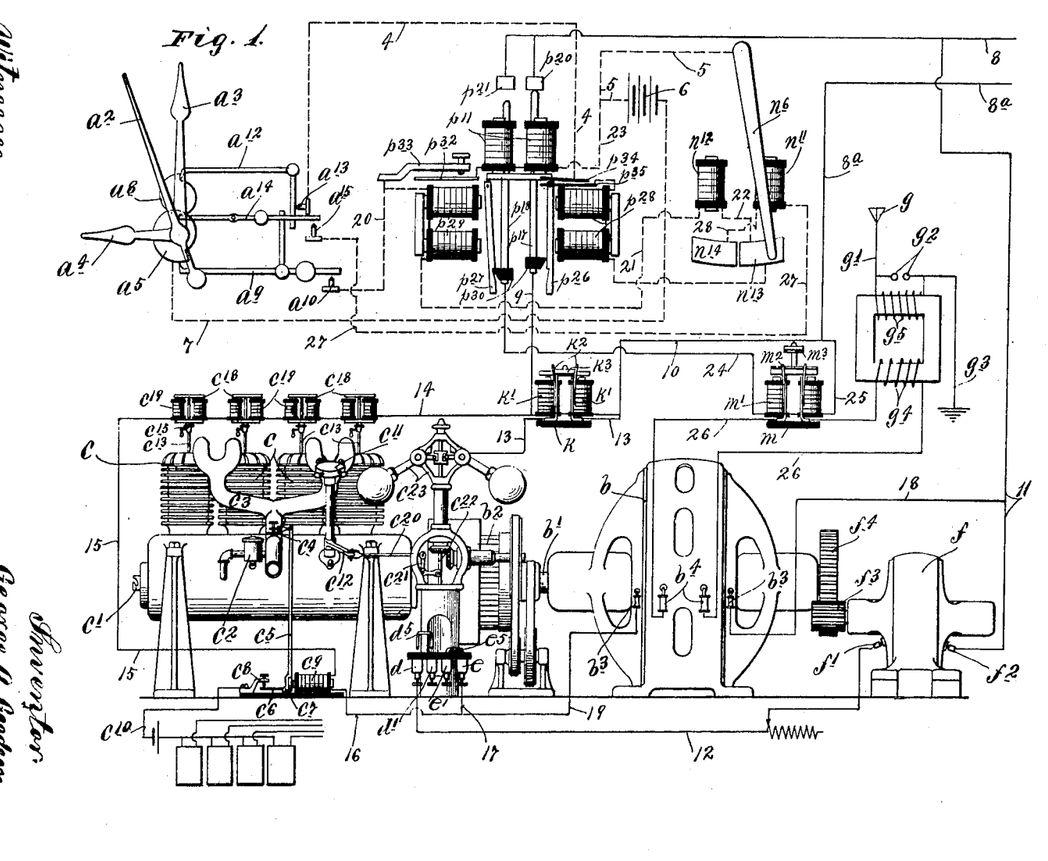
Figure 1 is a diagrammatic view of the mechanism at the sending station.

The so-called motor cut-out switch and the so-called engine cut-in switch are of substantially the same construction and both are best shown in Figs. 1, 9 and 10. The said motor cut-out switch comprises a pair of mercury contact cups $d$ and $d^1$, and the engine cut-in switch comprises a pair of mercury-containing contact cups $e$ and $e^1$. The outer contact cups $d$ and $e$ are insulated from the engine frame, while the inner contact cups $d^1$ and $e^1$ are grounded through the engine frame.

$d^2$ indicates a contact lever pivoted at $d^3$ and provided with a short outwardly extended finger $d^4$ adapted to be engaged by the trip pin $c^{28}$ of the lever $c^{25}$. At its free end, the contact lever $d^2$ is provided with a U-shaped contact $d^5$, the depending prongs of which normally are dipped in the mercury of the cups $d$ and $d^1$.

$e^2$ indicates a contact lever which is pivoted at $e^3$ and provided with a short inwardly projecting finger $e^4$, that is adapted to be engaged by the trip pins $c^{29}$ of the trip lever $c^{26}$. At its free end, the contact lever $e^2$ is provided with a U-shaped contact $e^5$, the depending prongs of which are normally above and are adapted to be dipped in the mercury of the cups $e$ and $e^1$. As shown in Fig. 10, the contact lever $e^2$ is put under yielding pressure to rise by a light coiled spring $e^6$. The lever $d^2$ is yieldingly pressed upward by the same spring arrangement.

Figure 7:
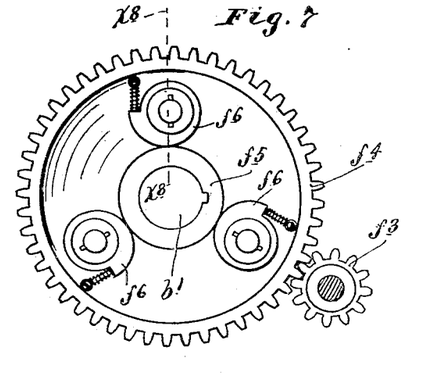
Fig. 7 is a detail in section on the line $x^7$ $x^7$ of Fig. 6, showing a one-way friction clutch of the spark-generating plant.
Figure 8:
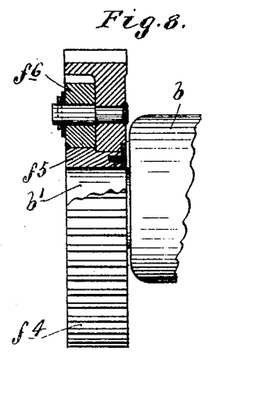
Fig. 8 is a view partly in elevation and party in section on the line $x^8$ $x^8$ of Fig. 7.

*Engine cranking motor.*—The motor for cranking the engine, that is, for imparting to the crank shaft thereof the required initial starting speed is indicated as an entirety by the character $f$, and the terminals of its field are indicated by $f^1$ and $f^2$, in Fig. 1. The armature shaft of the said motor is provided with a spur pinion $f^3$ (see Figs. 1, 7 and 8), that meshes with a spur gear $f^4$ that is loosely mounted on a clutch hub $f^5$ secured to the projecting adjacent end of the shaft $b^1$ of the alternating current generator $b$. On the face of the motor-driven gear $f^4$ is a multiplicity of spring-pressed eccentric friction clutch members that engage the clutch hub $f^5$. These eccentric clutch members $f^6$ operate under a driving force from the cranking motor $f$ to rotate the generator and engine crank shafts, as required to crank or start the engine; but when the said cranking motor is thrown out of action and the generator is driven by the explosive engine, the said clutch members $f^6$ slip freely and thereby permit the armature shaft of the cranking motor to remain stationary.

*Sending antenna and step-up transformer.*—The sending antenna, or aerial wire $g$ is connected by a wire $g^1$ to one of a pair of condensing balls $g^2$, the other of which balls is grounded by a wire $g^3$, as shown in Fig. 1, and which two balls are spaced apart to afford the desired spark gap.

$g^4$ and $g^5$ indicate, respectively, the primary and secondary coils of the step-up transformer, and the terminals of which latter coil are connected to the wires $g^1$ and $g^3$ on opposite sides of the balls $g^2$.

*Starting and sparking switches.*—These two devices are, as shown, of identically the same construction (see Figs. 1, 5 and 6) and are, as shown, applied, respectively, to insulating plates $k$ and $m$, for the sake of convenience, located on the engine supporting sub-structure $c^{32}$. Said starting switch comprises an electromagnet $k^1$, a pair of contacts $k^2$ and a pivoted armature-equipped contact lever $k^3$ that is normally spring-held in a retracted or raised position, but is adapted to be moved into engagement with the contacts $k^2$ when the magnet $k$ is energized. The contacts $k^2$ are applied to the insulating base $k$ and are thereby insulated from each other. Of the corresponding parts of the so-called sparking switch, $m^1$ indicates a magnet, $m^2$ the insulated contacts on the base $m$, and $m^3$ the armature-equipped contact lever, which is normally spring retracted and adapted to be forced into engagement with the contacts $m^2$ when the magnet $m$ is energized.

Figures 11, 12:
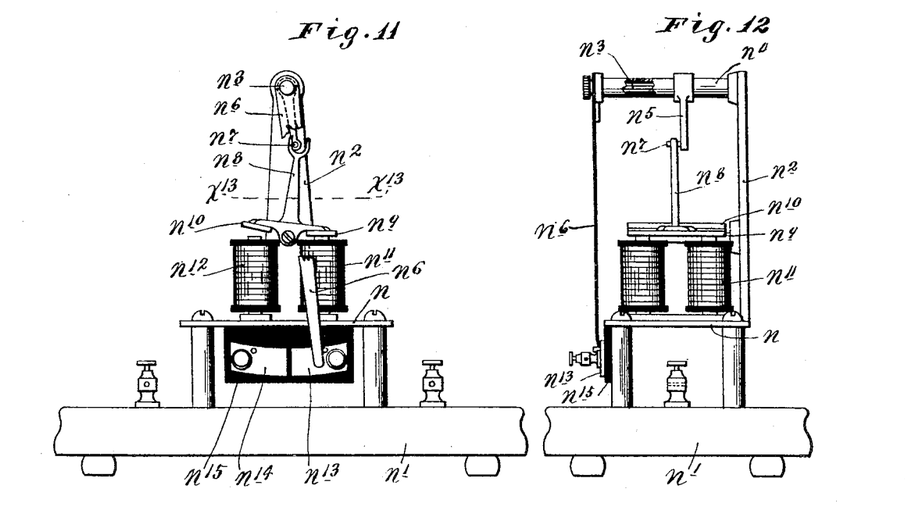
Fig. 11 is a view in front elevation with some parts broken away, showing the so-called time circuit switch of the sending station.
Fig. 12 is a side elevation of the parts shown in Fig. 11.
Figure 13:
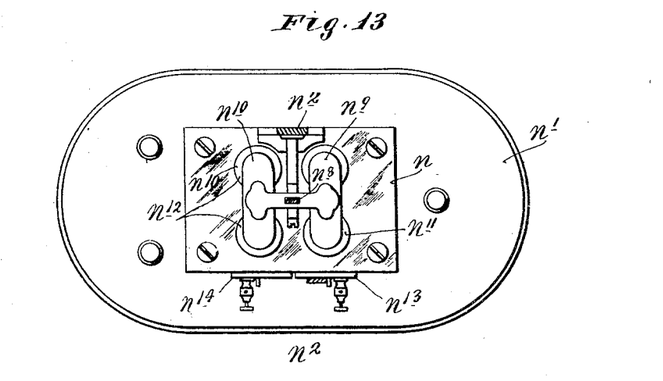
Fig. 13 is a horizontal section taken on the line $x^{13}$ $x^{13}$ of Fig. 11.
Figures 14, 17, 18:
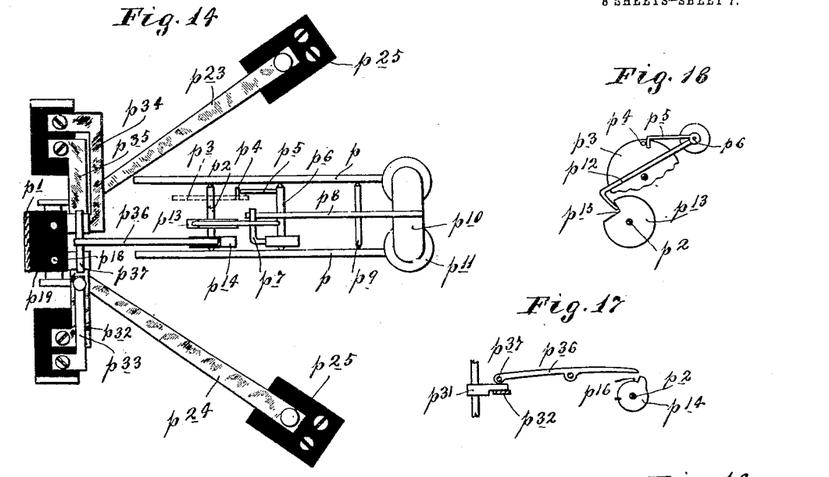
Fig. 14 is a plan view of the so-called discharger of the sending station.
Figs. 17 and 18 are detail views in elevation showing different cams and coöperating levers of the discharger.
Figure 15:
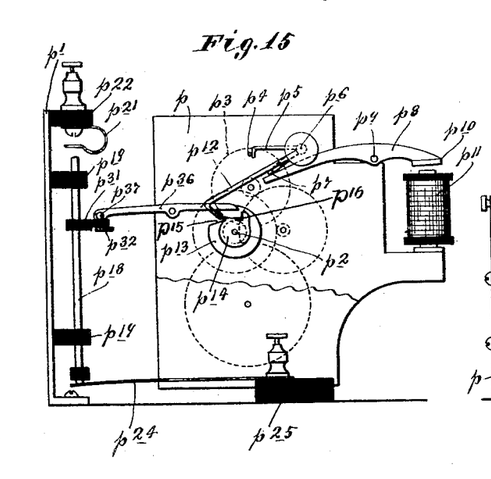
Fig. 15 is a side elevation of the said discharger, some parts being broken away and some parts being shown in diagram only.

*Time circuit switch.*—This switch, as shown, in Figs. 11 and 12 comprises a metal framework $n$ mounted on an insulated base $n^1$ and provided with a bearing pedestal $n^2$. The horizontal spindle $n^3$ is fixed to the upper end of the pedestal $n^2$, and a sleeve $n^4$ is mounted to oscillate thereon. Rigidly secured to the sleeve $n^4$ is a short arm $n^5$ and a long spring-contact arm $n^6$. The short arm $n^5$ has a laterally projecting pin $n^7$ that is subject to the pronged upper end of a trip arm $n^8$, the lower end of which is pivotally connected to the pedestal $n^2$ and is provided with oppositely off-set armatures $n^9$ and $n^{10}$ that are subject, respectively, to magnets $n^{11}$ and $n^{12}$ mounted on the framework $n$. The lower end of the contact arm $n^6$ is alternately engageable with contact plates $n^{13}$ and $n^{14}$, shown as secured to an insulating plate $n^{15}$, and thereby insulated from each other and from the framework $n$ which serves to support the said insulating plate.

*Discharger.*—This device is best shown in Figs. 14 to 18, inclusive, but is also shown in Fig. 1.

$p$ and $p^1$ indicate metallic frame sections of the discharger, upon the former of which a suitable clockwork or spring motor is mounted. Of the parts of this clockwork or spring motor, which is shown diagrammatically in Fig. 15, it is only necessary to specifically note one of the spring motor-driven shafts $p^2$ and a wheel $p^3$, which latter is driven at a relatively high speed as compared with the shaft $p^2$ and is provided with a profile stop pin or lug $p^4$ that is normally pressed against the free end of a lock lever $p^5$. The lock lever $p^5$ is secured to a spindle $p^6$ pivotally supported by the frame $p$ and provided with a laterally bent trip arm $p^7$, the end of which rests upon the free end of an armature lever $p^8$. This armature lever $p^8$ is pivotally connected at $p^9$ to the frame $p$ and, at its outer end, has an armature $p^{10}$, subject to a magnet $p^{11}$. A third and relatively long arm $p^{12}$, having a hooked free end, is also secured to the spindle $p^6$.

Figure 16:
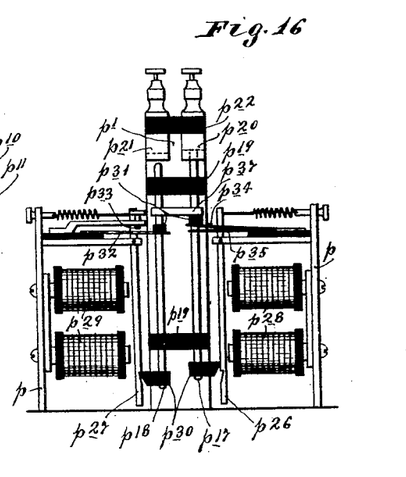
Fig. 16 is a front elevation of the discharger.

Rigidly secured to the shaft $p^2$ are two cams $p^{13}$ and $p^{14}$. The said cams $p^{13}$ and $p^{14}$ are notched, respectively, at $p^{15}$ and $p^{16}$. The hooked end of the arm $p^{12}$ normally rests in the notch $p^{15}$ and permits the engagement of the arm $p^5$ with the stop pin $p^4$. Vertically movable contact plungers $p^{17}$ and $p^{18}$ are mounted for vertical movements through insulated bearings $p^{19}$ on the frame section $p^1$. These plungers are adapted to engage respectively with contacts $p^{20}$ and $p^{21}$, shown as connected to insulating bearings $p^{22}$ on the frame section $p^1$. Spring contacts $p^{23}$ and $p^{24}$ engage, respectively, with the lower ends of the contact plungers $p^{17}$ and $p^{18}$ and yieldingly press the same upward. The spring contacts $p^{23}$ and $p^{24}$ are shown as rigidly secured to fixed insulating blocks $p^{25}$. Normally, the contact plungers $p^{17}$ and $p^{18}$ are held at their lowermost or inoperative positions, respectively, by pivoted spring-pressed armature levers $p^{26}$ and $p^{27}$ supported by the frame $p$ and subject, respectively, to magnets $p^{28}$ and $p^{29}$. As shown, the said arms $p^{26}$ and $p^{27}$, near their free ends, are provided with notches that normally engage the projecting ends of insulating lock blocks $p^{30}$ secured to the lower ends of the two plungers $p^{17}$ and $p^{18}$. Near their upper portions, the plungers $p^{17}$ and $p^{18}$ are provided, respectively, with projecting bearing lugs $p^{31}$ of insulating material. Normally, the lug $p^{31}$ of the plunger $p^{18}$ engages the free end of a leaf spring $p^{32}$ and holds the same out of engagement with the contact $p^{33}$ (see Figs. 1 and 16). Normally, also, the lug $p^{31}$ of the plunger $p^{17}$ engages the free end of a spring contact $p^{34}$ and holds the same engaged with a companion contact $p^{35}$ (see Fig. 14), which spring contact $p^{34}$, when the plunger $p^{17}$ is raised, as shown in Fig. 16, will, of itself, spring out of engagement with the said contact $p^{35}$. The cam $p^{14}$ of the motor-driven shaft $p^2$ is operative upon the inner end of a plunger restoring lever $p^{36}$, which is intermediately pivoted to the frame $p$ and, at its outer end, is provided with a transverse bar $p^{37}$ that rests upon, or is immediately above, the lugs $p^{31}$ of the two plungers $p^{17}$ and $p^{18}$, so that under the rotation of the said cam $p^{14}$, both plungers will be moved downward to a normal position and there secured by the engagement of the armature levers $p^{26}$ and $p^{27}$ with projecting blocks $p^{30}$ thereof.

Figure 19:
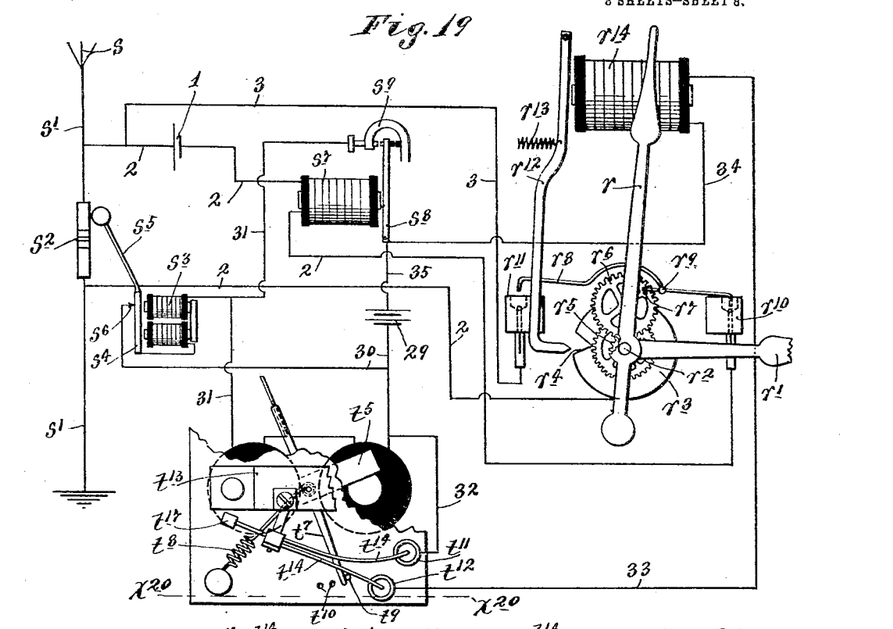
Fig. 19 is a diagrammatic view of the receptor cloc which is located at a point distant from the sending station and has no connection with the sending station, except such as is afforded by the ether and the earth.
Figures 20, 21:
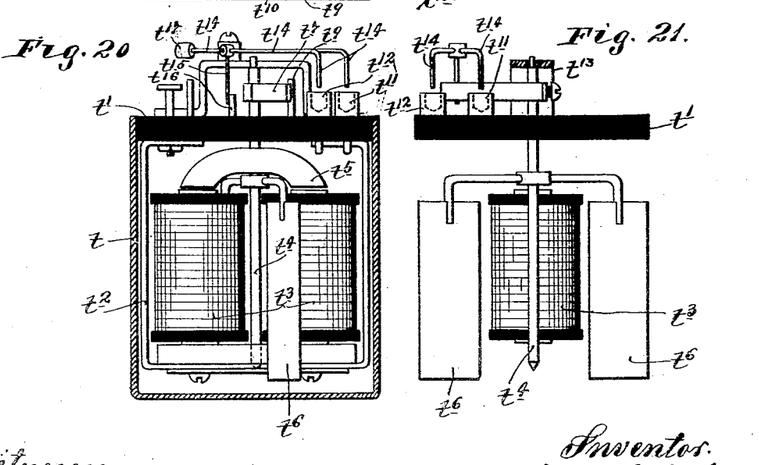
Fig. 20 is a vertical section taken on the line $x^{20}$ $x^{20}$ of Fig. 19, showing the so-called selector for coöperation with the receptor clock.
Fig. 21 is a side elevation of parts of the selector with the cup or casing removed.

*Receptor clock.*—At the receiving station (which receiving stations may, of course, be practically unlimited in number), there is a receptor clock installation comprising one or more receptor clocks proper, a single selector, a receiving antenna, a coherer, and an automatically actuated decoherer, together with suitable electrical connections, including, preferably, local battery circuits and a relay (see Figs. 19, 20 and 21). The receptor clock may be, and preferably is, an electrically wound clock of standard or any suitable type and, hence, it is only necessary to note the minute hand $r$ and the hour hand $r^1$. The shaft $r^2$, which carries the minute hand $r$, also carries a time-correcting disk or member $r^3$, having a single V-shaped peripheral notch $r^4$. The minute hand shaft $r^2$ also carries a spur pinion $r^5$ that meshes with a spur gear $r^6$ of three times the diameter thereof, so that the said gear will be given a complete rotation, once every three hours which, it will be remembered, is the time of rotation of the cam $a^8$ of the master clock. This "three hour gear" is provided with a laterally projecting pin or lug $r^7$ that is adapted to engage a short intermediate projection of a contact lever $r^8$ that is intermediately pivoted at $r^9$. This contact arm $r^8$ is grounded through the framework of the clockwork, and its downwardly bent free ends are adapted to be alternately engaged in the mercury of mercury-containing cups $r^{10}$ and $r^{11}$. The lefthand end of the contact lever $r^8$ is the heavier of the two ends so that normally the contact $r^{11}$ will be connected to the clockwork and the contact $r^{10}$ will be electrically disconnected therefrom. In Fig. 19, the righthand end of the contact lever $r^8$ is shown as engaged with the contact $r^{10}$ by the action of the gear pin $r^7$ on the short intermediate projection of said contact lever.

For engagement with the V-shaped notch $r^4$ of the disk $r^3$ of the minute hand shaft, is provided an armature-equipped clock-setting lever $r^{12}$, which is pivoted at its upper end and is normally retracted by a light coil spring $r^{13}$, but is adapted to be given an operative movement by a magnet $r^{14}$. The point of the laterally bent end of the setting lever $r^{12}$ is made web-shaped for engagement with the V-shaped notch $r^4$, and the said engaging parts are so related to each other and to the minute hand $r$, that, whenever the said end of the lever is forced to the bottom of the said V-shaped notch, the minute hand $r$ will be set exactly at twelve on the clock dial and, of course, the hour hand will be accurately set on the hour marks whenever the minute hand is thus set.

*Receiving antenna, coherer, decoherer and relay.*—The receiving antenna or aerial wire $s$ is connected to the ground by a wire $s^1$ through a coherer $s^2$, as shown, of the type wherein nickel and silver filings are employed. The decoherer employed involves an electro-magnet $s^3$, a vibratory armature $s^4$ which carries a clapper $s^5$ and is engageable and disengageable with a fixed contact $s^6$. This magnet and clapper are of the automatically electric bell structure and, in practice, I have employed the mechanism of an electric bell, simply removing the bell proper and arranging the clapper to strike against the coherer $s^2$.

Of the parts of the relay, $s^7$ indicates the magnet, $s^8$ the spring-retracted armature lever and $s^9$ the fixed contact with which the lever $s^8$ is engaged when said magnet is energized.

*Selector.*—Of the parts of this selector, as preferably constructed, $t$ indicates a cup of brass or other non-magnetic material, which is provided with an upper end closure or cover $t^1$ of insulating material, which supports a depending yoke $t^2$, the lower portion of which is secured to a pair of electro-magnets $t^3$. Extending vertically through the cover $t^1$ and journaled therein and in the tail piece of the magnet $t^3$, is a spindle $t^4$ which carries an armature $t^5$ normally occupying a position substantially as shown in Fig. 19 slightly out of line with the cores of the magnets $t^3$. The spindle $t^4$ also carries a pair of depending blades $t^6$. The cup $t$ is nearly or quite filled with some suitable heavy liquid, such, for instance, as glycerin, and the blades $t^6$ working therein retires under slow movements of the armature $t^5$ when the magnets $t^3$ are energized. Above the cover $t^1$, the spindle $t^4$ is provided with a long finger $t^7$ which is normally held by a spring connection $t^8$, against a stop pin $t^9$ which is insertable in any one of a series of perforations $t^{10}$ formed in the said cover $t^1$. On the cover $t^1$ is a pair of mercury cup contacts $t^{11}$ and $t^{12}$. Intermediately pivoted to a bearing bracket $t^{13}$ on the cover $t^1$ is a light contact lever $t^{14}$ having depending prongs that are adapted to be simultaneously dipped in the mercury of the cups $t^{11}$ and $t^{12}$. The hub of this contact lever $t^{14}$ is provided with a depending finger $t^{15}$ normally held against a stop pin $t^{16}$ on the cover, by the weighted end $t^{17}$ of said lever. This finger $t^{15}$ is adapted to be engaged by the finger $t^7$ of the armature actuated spindle $t^4$, to thereby force the prongs of the lever $t^{14}$ into the mercury of the cups $t^{11}$ and $t^{12}$. When the magnet $t^3$ is energized, armature $t^5$ will be alined with the cores thereof, and the prongs of contact lever $t^{14}$ will be dipped into the cups $t^{11}$ and $t^{12}$.

*Operation.*—Fig. 1 shows the condition of the master-clock and other parts of the installation at the sending station, at a time about four seconds before the even hour upon which the electrical vibration or Hertzian wave impulse is to be produced. The description of the operation should, however, start from the time somewhat more than one-half minute prior to this wave producing period, at which time contacts $a^9$—$a^{10}$ and contact $a^{12}$—$a^{13}$ of the master-clock are separated, as shown in Fig. 2, while the contacts $p^{34}$—$p^{35}$ of the discharger are engaged and the discharged contacts $p^{32}$ and $p^{33}$ are separated. At this time, also, the contact arm $n^6$ of the time circuit switch is engaged with the righthand fixed contact $n^{13}$; the starting switch $k$ and sparking switch $m$ are both open; and, in the motor cut-out and engine cut-in switches, the contact $d^5$ of the former is lowered into the cooperating mercury cups $d$—$d^1$, while the contact $e^5$ of the latter switch is raised out of the mercury cups $e$—$e^1$. During this normal period of inactivity at the sending station, the receptor clock mechanism and its accessories also maintain normal conditions, that is, the clock runs in the usual way uneffected in any way by the associated devices. At such time, the contact lever $r^3$, instead of being in the position shown in Fig. 19, is connected to the mercury cup $r^{11}$ and is disengaged from the mercury cup $r^{10}$. This breaks the so-called coherer circuit which includes a battery 1, wires 2, relay magnet $s^7$, the clockwork, the lever $r^8$, mercury contact $r^{10}$, the coherer $s^2$ and a portion of wire $s^1$; and at the same time it short circuits the coherer through a circuit including one of the wires 2, the clockwork, the lever $r^8$, mercury contact $r^{11}$, a wire 3 and portions of the wire $s^1$. The purpose of short circuiting the coherer during the inactive period is to prevent the same from being acted upon by stray Hertzian waves or electrical vibrations which may be sent out by apparatus other than that at the coöperating sending station of the system. Directing the attention again to the sending station, let it be assumed that both the minute and second hands of the master-clock have reached a point within one-half minute from the hour terminal upon which the clock-setting Hertzian waves are to be generated. At this time, the "three hour" cam $a^8$ of the master-clock drops the contact lever $a^{12}$ into engagement with the coöperating contact $a^{13}$ at a time while the contact lever $a^9$ is still held out of engagement with the contact $a^{10}$ by the minute hand cam $a^5$. The immediate effect of the engagement of the contacts $a^{12}$ and $a^{13}$ is to close the electric circuit through the wire 4, the contacts $p^{34}$—$p^{35}$ (which contacts are still engaged), the magnets $p^{28}$, the contact $n^{13}$, the contact arm $n^6$, the wire 5, the battery 6, the wire 7 and through the clockwork back to the said contact lever $a^{12}$. The energizing of the magnet $p^{28}$, as above noted, causes the armature lever $p^{26}$ of the discharger to release the contact plunger $p^{17}$, thereby permitting the latter to move upward into engagement with the fixed contact $p^{20}$. The upward movement of the said contact plunger $p^{17}$ does two things, to-wit; its lug $p^{31}$ permits the spring contact $p^{34}$ to disengage itself from the contact $p^{35}$, thereby breaking the above noted circuit, including the battery 6 and the magnets $p^{28}$. The second result of the upward movement of the plunger $p^{17}$ and its engagement with the contact $p^{20}$ is the closing of a circuit between live service wires 8 and $8^a$ as follows: from the live wire 8, through the contact $p^{20}$, the plunger $p^{17}$, the contact $p^{23}$, the wire 9, magnets $k^1$ of the starting switch and the wire 10, back to the other live wire $8^a$. The closing of this circuit energizes the magnets $k^1$ of the starting switch, thereby drawing down the contact lever $k^3$ into engagement with the fixed contacts $k^2$, and thereby closing a circuit from the live service wires 8—$8^a$ through the field and armature of the starting motor $f$, which circuit thus closes as follows: from the service wire 8, through a wire 11, motor contacts $f^2$, motor armature and field and through a wire 12, thence through mercury contacts $d$ and $d^1$ and contacts $d^5$ of the motor cut-out switch (which contact $d^5$ is then lowered), thence through the engine framework, a wire 13 and engaged contacts $k^2$—$k^3$ to the wire 10 and through the latter to the other live wire $8^a$. The effect of this is to start the motor $f$ and this motor, once thrown into action, cranks the engine up to a proper predetermined starting speed.

When the governor balls have been thrown about half way out, by the speed of the engine acquired by the action of the starting motor $f$, the governor rod $c^{22}$ will be forced downward far enough to cause the contact $d^5$ of the motor starting switch to be raised into an inoperative position and the contact $e^5$ of the engine cut-in switch to be dropped into the coöperating mercury cups $e$—$e^1$, as shown in Fig. 1. This change in the condition of the motor cut-out and engine cut-in switches has the following effects, to-wit: first, it breaks the circuit through the starting motor $f$ and permits the same to drop back and remain idle, and, in the second place, it automatically starts the explosive engine by opening the throttle $c^4$, closing the igniter circuit and closing the vent valves $c^{16}$, which latter action closes the cylinders to compression. The above noted automatic starting of the engine, after the cranking speed has been imparted thereto, results from the closing of a circuit through the magnets $c^9$ and $c^{19}$ between the service wires 8 and $8^a$, which circuit thus closes as follows: from the live wire 8, through the contact $p^{20}$, the plunger $p^{17}$, the contact $p^{23}$, the wire 9, a wire 14, the magnet $c^{19}$, a wire 15, the magnet $c^9$, a wire 16, a common return wire 17, contacts $e$—$e^1$ and $e^5$ to the engine frame, and from thence through the wire 13, contacts $k^2$—$k^3$, and the wire 10 to the other live wire $8^a$. At the same time, the circuit closed through the field of the alternating current generator $b$ is as follows: from the live wire 8, through a portion of the wire 11, through a wire 18 and field terminals $b^3$ of said generator to a wire 19, and from thence through a common return wire 17 and other return connections just above traced, back to the other live wire $8^a$.

When the second hand $a^2$ of the master-clock reaches its straight up position in line with the twelve hour mark on the dial, its cam $a^5$ will permit the contact lever $a^9$ to engage with the coöperating fixed contact $a^{10}$. This energizes the magnet $p^{29}$ of the discharger and the lefthand magnet $n^{12}$ of the time circuit switch, by closing a circuit as follows: from the engaged contacts $a^9$ and $a^{10}$, through a wire 20, magnets $p^{29}$, a wire 21, the magnet $n^{12}$, a wire 22, the contact lever $n^6$, the wire 5, the battery 6, the wire 7, and clockwork, back to said contact $a^9$. When the magnet $p^{29}$ of the discharger is energized, it causes the armature lever $p^{27}$ to release the contact $p^{18}$, and the latter then moves upward and engages with the contact $p^{21}$, and this closes a circuit through the magnets $p^{11}$ as follows: from the contacts $p^{32}$ and $p^{33}$ which are then engaged, through magnets $p^{11}$, through the wire 23, a portion of the wire 5, the battery 6, the wire 7, to the clockwork, and thence through the contacts $a^9$—$a^{10}$ and the wire 20, back to the said engaged contacts $p^{32}$ and $p^{33}$.

When the magnet $p^{11}$ is energized, it moves the armature lever $p^8$ and causes the arms $p^5$ and $p^{12}$ to release the spring motor of the discharger, and simultaneously with this action, the engagement of the plunger $p^{18}$ with the fixed contact $p^{21}$ closes the circuit from one to the other of the live wires, through the field of the alternating current generator $b$, and this, as is evident, throws the generator into action, with the obvious result which, however, will be further considered after tracing the said circuit thus closed, which is as follows: from the live wire 8, through the contact $p^{21}$, the plunger $p^{18}$, the contact $p^{24}$, a wire 24, magnets $m^1$ of the high tension switch, and through a wire 25 to the other live wire $8^a$. The magnets $m^1$ being thus energized, draw down the contact lever $m^3$ into engagement with the contacts $m^2$, thereby closing the high tension circuit of the alternating current generator, through the armature and armature contacts $b^4$, through high tension wires 26, primary transformer coil $g^4$, and engaged contacts $m^2$ and $m^3$ of the high tension switch. The closing of this sparking switch is the final act of the production of the sparks in the spark gap between the ball $g^2$ and results in the sending of the so-called Hertzian waves into space from the antenna $g$.

In the next to the last preceding paragraph, it was shown how the lefthand magnet $n^{12}$ of the time circuit switch was energized simultaneously with the magnet $p^{29}$ of the discharger, under the control of the second hand of the master-clock. When said magnet $n^{12}$ was energized, the contact arm $n^6$ was moved into engagement with the lefthand contact $n^{14}$ of the said time circuit switch, thereby breaking the circuit through the magnets $n^{12}$, $p^{11}$ and $p^{29}$, immediately after the said magnets had performed their respective above noted functions.

The spark and the resulting Hertzian waves produced as above stated will continue for a predetermined interval of time, preferably for about five seconds, at the limit of which time the cam $p^{16}$, driven by the released spring motor of the discharger, acting on the resetting lever $p^{36}$, will force both of the contact plungers $p^{17}$ and $p^{18}$ out of engagement with the respective contacts $p^{20}$ and $p^{21}$ and back to their normal positions, where they will be secured by their respective armature levers $p^{26}$ and $p^{27}$. Return of the contact plungers $p^{17}$ and $p^{18}$ to normal position causes the breaking of the circuits through the discharger magnet $p^{11}$, the starter switch magnet $k^1$, sparking switch magnet $m^1$, compression magnets $c^{19}$ and igniter magnet $c^9$, with the obvious result that the explosive engine will be thrown out of action and the speed thereof will immediately drop. This will restore to normal conditions all the parts at the sending station except the lever $n^6$ of the time circuit switch. At a time approximately one hour and a half after the sending of one electrical impulse, the "three hour" cam $a^8$, acting on the contact lever $a^{14}$, engages the latter with the fixed contact $a^{15}$ and closes the circuit through the righthand time circuit switch magnet $n^{11}$ as follows: from the said contact $a^{15}$, through a wire 27 to said magnet $n^{11}$, from thence through a wire 28 to the contact $n^{14}$, thence through lever $n^6$, the wire 5, the battery 6 and the wire 7 to the clockwork, and from thence to the lever $a^{14}$ back to said contact $a^{15}$. The magnet $n^{11}$, being thus energized, will flip the contact lever $n^6$ back into its normal position into engagement with the contact $n^{13}$, thereby breaking the circuit through the said magnet $n^{11}$ and leaving the parts at rest.

The manner in which the Hertzian waves or electromagnetic oscillations are produced at the sending station and sent out in all directions through the ether and into space at predetermined intervals, assumed to be once every three hours, having now been fully described, attention should be directed to Figs. 19, 20 and 21, which show the receptor clock and associated parts which make up what, for convenience, may be designated as a receiving station. It has also been above stated that any desired number of clocks at a particular receiving station may be controlled by the Hertzian waves operating through a common coherer, selector, relay and battery connections or local circuits, but for the purposes of this case, the receiving station will be assumed to include only one receptor clock proper. It should here be remembered that the gear $r^6$ of the receptor clock, which carries the pin $r^7$, is given one complete rotation every three hours and, hence, is timed to correspond to movements of the so-called "three hour" cam $a^8$ of the receptor clock. Furthermore, the pin $r^7$ is so arranged that it will engage the short intermediate arm or cam lever $r^8$ at a time about two and one-half minutes before the spark generating period and will thereby hold said lever $r^8$ engaged with the contact $r^{10}$, as shown in Fig. 19, until about two and one-half minutes after the termination of the spark or wave generating period. At all other times during the three hour intervals, said lever $r^8$ will be engaged with the contact $r^{11}$, but during the entire spark or wave generating period and while the master clock is being set, said lever, $r^8$ remains in the said position shown in Fig. 19.

When the Hertzian waves are sent out by the master clock, they will strike the receiving antenna $s$ and be grounded through the coherer $s^2$, thereby reducing the resistance of the filings of the said coherer (an action well known in wireless telegraphy), to such an extent that the current from the low tension battery 1 will flow through the said filings, through wires 2, the clockwork, contact $r^{10}$, contact lever $r^8$ and relay magnet $s^7$, thus energizing the said relay magnet.

When the relay magnet $s^7$ is energized, it draws the lever $s^8$ into engagement with the fixed contact $s^9$, thereby closing multiple circuits from a relatively strong battery 29, through the selector magnet $t^3$ and the decoherer magnet $s^3$ and circuit wires 30 and 31. The decoherer is thus caused to remain in action as long as the Hertzian wave impulse at the sending station is continued and, hence, the relay magnet $s^7$ will hold the lever $s^8$ engaged with the fixed contact $s^9$, as above described, throughout the said wave generating period, which is assumed to be five seconds in duration; and the magnet $t^3$ of the selector will remain energized throughout the same period. When the said selector magnet $t^3$ is energized, it acts upon the armature $t^5$ and begins to draw the same into line with its pole pieces, but this movement of the said armature and of the spindle $t^4$ is, as already described, retarded by the blades $t^6$ which work in the liquid of the cup $t$. This movement of the said spindle and armature takes place against the tension of the spring $t^8$ and the said spring should be so adjusted and the said blades $t^6$ should be so normally set that it will require approximately but preferably a fraction of a second less than the period of five seconds continued action of the magnet $t^3$ of the armature $t^5$ to produce sufficient movement of the spindle $t^4$ to cause its arm $t^7$, acting on the depending finger $t^{15}$, to force the depending prongs of the contact lever $t^{14}$ into the mercury of the cups $t^{11}$ and $t^{12}$. When the said lever $t^{14}$ makes contact between the mercury of the cup $t^{11}$ and $t^{12}$, it closes a circuit through the clock-setting magnet $r^{14}$ as follows: from battery 29 through a portion of one of the wires 30, and through a wire 32 to contact $t^{11}$, thence through contact lever $t^{14}$ and contact $t^{12}$ to wire 33, thence through magnet $r^{14}$ and wires 34 and 35 back to said battery 29. When the setting magnet $r^{14}$ is energized, it moves the beveled end of the spring retracted clock-setting lever $r^{12}$ in the V-shaped notch $r^4$ of the disk $r^3$ which, it will be remembered, is rigid with the minute hand $r$; and this movement of the said lever will set the said minute hand and, hence, also, the hour hand of the receptor clock exactly on the hour; and this is so regardless of whether the said hand at the time just subsequent to setting is ahead or behind time, or, in other words, is running fast or slow. The termination of the five second wave sending interval will take place approximately simultaneously with the completion of the inward movement of the clock-setting lever $r^{12}$ and, hence, the battery 1, being no longer capable of maintaining a circuit through the undisturbed filings of the coherer, after the decoherer has gone out of action, the relay magnet $s^7$ will release the spring retracted relay lever $s^8$, thereby breaking the circuit through the selector magnet $t^3$ with the resulting effect that the contact lever $t^{14}$ will break the circuit through the clock-setting magnet $r^{14}$, thereby permitting the said spring-retracted clock-setting lever $r^{12}$ to be returned to its normal or inoperative position immediately after it has performed its functions of properly setting the receptor clock. At a little later period already indicated, the pin $r^7$ will permit the contact lever $r^8$ to assume its normal engagement with the contact $r^{11}$, thereby again short-circuiting the coherer, so that it will be uneffected by any stray Hertzian waves or electromagnetic oscillations, which may be sent out by wireless telegraphy or other analogous apparatus, other than those emitted from the proper sending station under the control of the master-clock.

The so-called sparking switch is illustrated as located in the high tension circuit of the generator, but the said switch may be located in either the field or armature circuit of the said generator.

The source of the electrical energy, while preferably of the alternate current generator, may be a direct current generator or a mechanical interrupter.

Instead of the grounded receiving antenna, in connection with the receptor clock, capacity plates may be used.

Instead of an explosive engine for driving the generator, any other suitable prime mover or primary power supplying mechanism may be employed. In fact, the term " engine " as herein broadly used, is intended to include such a device, for example, as a water wheel.

What I claim is:

1. The combination with a generator and coöperating means for producing Hertzian waves, of a normally open sparking switch in the generator circuit, an engine for driving said generator, and time-controlled means for starting said engine and for subsequently closing said sparking switch to produce the spark.

2. The combination with a generator and coöperating means for producing Hertzian waves, of a normally open sparking switch in the generator circuit, an engine for driving said generator, a clock mechanism, and a clock-controlled discharger with coöperating electrical connections for first starting said engine and subsequently closing said sparking switch, the said discharger having a timed mechanism for again opening said sparking switch, to thereby determine the wave-producing period.

3. The combination with a generator and an explosive engine for driving the same, of a motor for cranking said engine, a clock mechanism, and means controlled by said clock for first throwing said motor into action, second, for rendering the said explosive engine self-operative and, third, for closing the generator circuit during the predetermined period, substantially as described.

4. The combination with a generator and coöperating devices for producing Hertzian waves, of a normally open sparking switch in the generator circuit, a motor for driving said engine, a clock mechanism, and a discharger controlled by said clock mechanism and having connections for starting said motor and for subsequently closing said sparking switch to produce Hertzian waves.

5. The combination with a generator and coöperating means for producing Hertzian waves including a sparking switch in the generating circuit, means for driving said generator, and time-controlled means for starting and stopping said generator and for closing and opening said switch, substantially as described.

6. The combination with a generator and coöperating means for producing Hertzian waves, of an explosive engine for driving said generator, an electric motor for cranking said engine, a sparking switch in the generator circuit, a starting switch in the motor circuit, a clock mechanism, and a clock-controlled starter with electrical connections and coöperating devices operating, first, to close said starting switch and render said electric starter motor operative, and subsequently and after the explosive engine has acquired speed, to close said sparking switch and thereby produce the Hertzian waves.

7. The combination with an explosive engine having a throttle valve controlling the admission of fluid fuel thereto, and provided with a normally open compression valve in a vent from the cylinder thereof, and automatical clock-controlled means operative at predetermined times to open said throttle valve and to close said compression valve, substantially as described.

8. The combination with an explosive engine and a starting motor for cranking the same, said engine having a normally closed throttle valve and a normally open compression valve, of a clock mechanism, and a clock-controlled electrical mechanism with connections arranged, first, to render said motor operative to crank the engine and, subsequently, to open said throttle valve and close said compression valve, thereby rendering the engine self-operated.

9. The combination with a generator and means coöperating therewith to produce Hertzian waves, of an explosive engine for driving said generator, an electric motor for cranking said engine, a sparking switch in the generator circuit, an electric circuit with devices for starting said engine, a starting switch controlling the motor and engine starting circuits, a normally closed motor circuit cut-out switch and a normally opened engine circuit cut-in switch, engine-driven means for imparting reverse movements to said latter noted switches, when the said engine has been given a predetermined starting speed, a clock mechanism, and a clock-controlled discharger with electrical connections and coöperating devices arranged, first, to close said starting switch and, subsequently, to close said sparking switch and to thereby produce the spark.

10. The combination with a generator, of an explosive engine for driving the same, an electric motor for cranking said engine, a centrifugal governor driven by said engine, an engine starting circuit including a normally open governor-actuated engine cut-in switch, a motor circuit including a normally closed governor-actuated engine cut-out switch, a starting switch controlling both the motor and engine starting circuits, a sparking switch in the generator circuit, a clock mechanism, and a discharger controlled by said clock mechanism and comprising circuits and coöperating devices arranged, first, to close said starting switch, later, to close said sparking switch, and, still later, to open the said starting and sparking switches, substantially as described.

11. The combination with an explosive engine provided with a controlling valve mechanism, an igniter circuit and a timer, of a centrifugal engine-driven governor with mechanical connections for adjusting said timer, an engine starting circuit including a magnet for operating said controlling valve and including also a normally open engine cut-in switch, and a clock-controlled motor for cranking said engine at predetermined times, substantially as described.

12. The combination with a generator and coöperating means for producing Hertzian waves, of an explosive engine for driving said generator, an electric motor for cranking said engine, a motor circuit, an engine starting circuit with devices for operating engine-controlling elements, an engine-driven centrifugal governor, a starting switch controlling the motor and engine starting circuits, a sparking switch in the generator circuit, a clock-controlled discharger arranged to, first, close said starting switch and, later, to close said sparking switch, and reversely movable governor-actuated motor cut-out and engine cut-in switches respectively in the motor and engine starting circuits.

13. The combination with a Hertzian wave producer, of a discharger controlling said producer through two electric circuits and comprising independent normally open contacts, one in each of said circuits, a magnetic trip for each contact, a timed contact resetting device, a magnetic trip for the latter, and a clock mechanism with connections for closing circuits through the said magnets of said discharger in the proper order of succession, substantially as described.

14. The combination with a Hertzian wave producer, of a discharger controlling said producer through two electric circuits and comprising independent normally open contacts, one in each of said circuits, a magnetic trip for each contact, a timed contact resetting device, a magnetic trip for the latter, a clock mechanism with connections for closing circuits through the said magnets of said discharger in the proper order of succession, and a time circuit switch also controlled by said clock mechanism and operative to cut said discharger out of action except for a limited predetermined period.

In testimony whereof I affix my signature in presence of two witnesses.

GEORGE A. GOODSON.

Witnesses:
 HARRY D. KILGORE,
 FRANK D. MERCHANT.